(12) United States Patent
Tedesco et al.

(10) Patent No.: US 11,913,834 B2
(45) Date of Patent: Feb. 27, 2024

(54) SPATIALLY OFFSET RAMAN PROBE WITH COAXIAL EXCITATION AND COLLECTION APERTURES

(71) Applicant: Kaiser Optical Systems Inc., Ann Arbor, MI (US)

(72) Inventors: James M. Tedesco, Livonia, MI (US); Sean J. Gilliam, Plymouth, MI (US)

(73) Assignee: Endress+Hauser Optical Analysis, Inc., Ann Arbor, MI (US)

(*) Notice: Subject to any disclaimer, the term of this patent is extended or adjusted under 35 U.S.C. 154(b) by 145 days.

(21) Appl. No.: 17/402,798

(22) Filed: Aug. 16, 2021

(65) Prior Publication Data
US 2023/0048375 A1    Feb. 16, 2023

(51) Int. Cl.
*G01J 3/02* (2006.01)
*G01J 3/12* (2006.01)
*G01J 3/44* (2006.01)
*G02B 6/04* (2006.01)

(52) U.S. Cl.
CPC .......... *G01J 3/0243* (2013.01); *G01J 3/0208* (2013.01); *G01J 3/0218* (2013.01); *G01J 3/12* (2013.01); *G01J 3/44* (2013.01); *G02B 6/04* (2013.01); *G01J 2003/1213* (2013.01)

(58) Field of Classification Search
CPC ...... G01J 3/0243; G01J 3/0208; G01J 3/0218; G01J 3/12; G01J 2003/1213; G01J 3/44; G01J 5/0802; G02B 6/04; G02B 6/002; G02B 23/10; G02B 27/30;
(Continued)

(56) References Cited

U.S. PATENT DOCUMENTS

| 5,377,004 A | 12/1994 | Owen et al. |
| 7,148,963 B2 * | 12/2006 | Owen ................ G01N 21/645 356/301 |
| 8,675,190 B2 | 3/2014 | Owen et al. |

(Continued)

FOREIGN PATENT DOCUMENTS

| CN | 102519936 A | 6/2012 |
| EP | 3279642 A1 | 2/2018 |

(Continued)

*Primary Examiner* — Tarifur R Chowdhury
*Assistant Examiner* — Kemaya Nguyen
(74) *Attorney, Agent, or Firm* — Christopher R. Powers; Endress+Hauser (USA) Holding, Inc.

(57) ABSTRACT

An optical measurement probe for capturing a spectral response through an intervening material emitting unwanted background radiation includes: a first lens configured to receive light and collimate the light into a collimated excitation beam defining a first aperture; an objective element for focusing the collimated excitation beam to a point or region in a sample through the intervening material, wherein the objective element also receives light scattered by the sample and the intervening material and collimates the scattered light into a collimated collection beam defining a second aperture; and a blocking element within the collimated collection beam for removing the light scattered by the intervening material from the collimated collection beam received from the sample, wherein the second aperture defined by the collimated collection beam is at least two times greater than the first aperture defined by the collimated excitation beam.

20 Claims, 5 Drawing Sheets

(58) Field of Classification Search
CPC ... G01N 2001/2288; G01N 2201/0633; G01N 2223/316
See application file for complete search history.

(56) References Cited

U.S. PATENT DOCUMENTS

| | | | |
|---|---|---|---|
| 9,599,507 B2* | 3/2017 | Pawluczyk | G01J 3/4412 |
| 10,670,457 B2* | 6/2020 | Zhang | G01J 3/0227 |
| 2008/0180663 A1* | 7/2008 | Tedesco | G01J 3/0208 |
| | | | 356/301 |
| 2018/0038798 A1* | 2/2018 | Zhang | G01N 21/65 |
| 2018/0052099 A1* | 2/2018 | Hill | G01J 3/10 |

FOREIGN PATENT DOCUMENTS

| | | |
|---|---|---|
| EP | 3435072 A1 | 1/2019 |
| WO | 9901750 A1 | 1/1999 |

\* cited by examiner

SPATIALLY OFFSET RAMAN PROBE WITH COAXIAL EXCITATION AND COLLECTION APERTURES

TECHNICAL FIELD

The present disclosure relates generally to remote optical measurement probes and, in particular, to a probe that enables the benefits of spatially offset excitation and collection in a compact configuration.

BACKGROUND

Induced radiative effects such as Raman scattering and fluorescence have become extremely valuable tools associated with the non-destructive determination of molecular constituents. Indeed, Raman spectroscopy has become an established and practical method of chemical and structural analysis and characterization applicable to many different chemical species.

Raman spectroscopy is based on the principle that monochromatic excitation will be reflected, absorbed and scattered as a function of the particular molecule that receives the radiation. Most of the energy is elastically scattered at the same wavelength, known as Rayleigh scattering. A much smaller amount is scattered at different wavelengths, called inelastic or Raman scattering, wherein the scattered photon leaves some of its energy behind in the form of a vibration between bound atoms in the molecule that scattered that photon. In Raman spectroscopic analysis, these wavelength shifts of the scattered radiation are analyzed to determine sample properties.

Raman spectroscopy is gaining increasing acceptance in on-line process monitoring due in large part to developments in instrumentation and associated component technologies. For a number of process applications, Raman analyzers have demonstrated significant advantages over alternative techniques, such as gas chromatography, IR spectroscopy and NIR spectroscopy. As a non-destructive, real-time technique, Raman spectroscopy is compatible with a wide variety of samples, including opaque solids, aqueous solutions, emulsions and gases, without the need for sample preparation.

A conventional Raman system has three primary components: an excitation source, a sampling apparatus, and a detector. While these three components have come in varying forms over the years, modern Raman instrumentation uses a laser as the excitation source, a spectrometer for the detector, and a fiber-optic probe for the sampling apparatus. The probe illuminates the sample with the laser light and collects the scattered light from the sample using optical fibers, lenses or both. Complete systems typically further include a computer processor executing analysis software appropriate to the application.

To characterize a composition of a sample in a remote or hostile environment, optical fibers may be used to deliver excitation energy to a probehead and to transmit scattered radiation from the sample back to instrumentation for spectral analysis. The excitation laser, emitting radiation at an appropriate wavelength, is coupled to an input fiber as an excitation path, and a complementary collection path conventionally includes a second, collection fiber carrying return spectral information, including the scattered radiation, to a spectrograph.

In some instances, fiber-optic Raman probes may be located large distances from other equipment, including the spectrograph. Such installations are increasingly used in industrial applications for materials processing, process monitoring, and process control. As an example, industrial Raman spectroscopy for chemical process monitoring and control may use laser energy from a laser source installed in a central control room instrument. The instrument couples the laser radiation into an optical fiber cable that is routed to a remote probehead. The remote probehead may be installed in pipelines, process vessels and other locations that may be a significant distant from the laser source.

Figure 1:
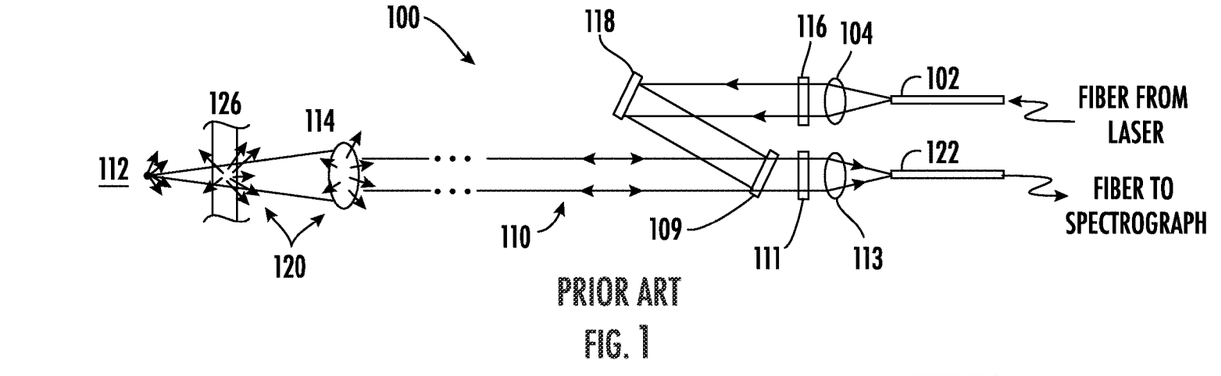
FIG. 1 schematically illustrates a simplified fiber-coupled remote Raman probehead of the prior art.

FIG. 1 schematically illustrates a simplified, conventional, fiber-coupled remote Raman probehead 100. Broadly, laser excitation radiation is delivered via fiber 102, collimated at 104, redirected at 118, and combined at 109 into a path 110 that may also carry scattered light collected from a sample 112 (i.e., collected light). A common objective 114 is used to both focus the laser radiation and collimate the collected light. A bandpass filter 116 and notch filter 111 pass and reject the laser wavelength, respectively. The collected light is focused at 113 and transmitted to a spectrograph via fiber 122. Other exemplary configurations are described in U.S. Pat. No. 5,377,004, entitled REMOTE OPTICAL MEASUREMENT PROBE, incorporated herein by reference, and elsewhere in the literature.

Note that the probe 100 of FIG. 1 is capable of penetrating certain barriers 126 (e.g., walls or windows) to analyze samples in vessels, containers, conduits and the like. Indeed, this ability enables Raman spectroscopy to be used in hostile or sterile environments without contaminating biological processes or compromising process flows. However, the barrier 126 generally introduces unwanted scattering, background Raman and/or fluorescence signatures 120 that may overlap with the Raman collection path, creating analysis challenges, e.g., noise. To a lesser degree, background signatures 120 from the objective 114 may also impact signal processing based on the specific materials chosen for the objective lens 114, e.g., UV grade fused silica or sapphire.

Figure 2:
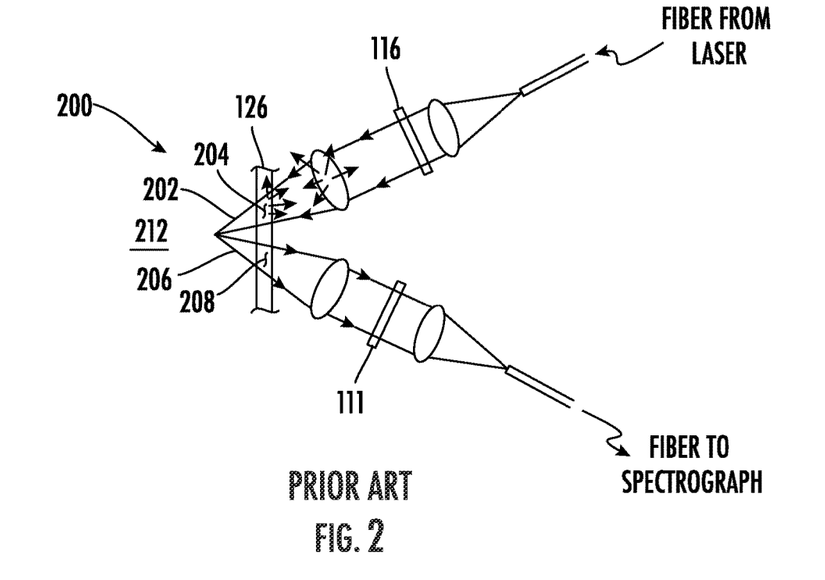
FIG. 2 is a simplified schematic view of a prior art SORS arrangement.

Raman probe construction techniques have been developed to alleviate the background signature problem just described. One approach is to use spatially offset Raman spectroscopy, or SORS. SORS is an established, prior art technique for obtaining a Raman spectrum of a sample inside of a container or behind a window while reducing the interference or contamination of the sample spectrum imparted by the fluorescence and/or Raman spectrum of the container or window material and focusing objective—i.e., background signature. FIG. 2 illustrates a simplified, conventional schematic of a SORS arrangement 200. The conventional SORS concept is to focus the excitation laser beam 202 through one spatial area 204 of the container or window 126 and collect the Raman scatter 206 from the sample 212 through a different spatial area 208 of the container or window 126.

While effective, the excitation and collection paths being at an angle to one another renders probe construction and implementation less efficient. These problems can be reduced somewhat through the use of a common objective lens 314 as shown in the example, prior art arrangement of FIG. 3. As with the configuration of FIG. 2, the laser-illuminated section 304 of window/container 126 is separate from the section 308 of the window/container 126 penetrated by the collection path 310. While this setup allows the excitation and collection paths to be parallel, the geometry is still less than optimal in terms of product size and overall efficiency.

Consequently, there is an outstanding need for a remote optical measurement probe configuration that enables a SORS-like excitation/collection separation to reduce container/window interference in a narrower, more compact probehead design.

SUMMARY

The probes and systems according to the present disclosure achieve the desired window/container background signature rejection advantages of prior-art, spatially offset spectroscopic techniques while further maintaining most of the signal collection advantage of conventional, coaxial excitation and collection paths. These advantages can be substantial in optically clear samples, as are found in many process monitoring and control applications, e.g., bioprocessing and biopharmaceutical applications and fermentation of spirits among others known by those skilled in the art of the present disclosure.

In one aspect of the present disclosure, an optical measurement probe for capturing a spectral response through an intervening material emitting unwanted background radiation comprises: a first lens configured to receive light and collimate the light into a collimated excitation beam defining a first aperture; an objective element adapted to focus the collimated excitation beam to a point or region in a sample through the intervening material, wherein the objective element is further adapted to receive light scattered by the sample and the intervening material and to collimate the scattered light into a collimated collection beam defining a second aperture; and a blocking element disposed within the collimated collection beam and configured to remove the light scattered by the intervening material from at least a portion of the collimated collection beam received from the sample, wherein the second aperture defined by the collimated collection beam is at least two times greater than the first aperture defined by the collimated excitation beam.

In at least one embodiment, the probe further comprises a mirror disposed in the collimated collection beam, wherein the mirror is operative to redirect the collimated excitation beam to the objective element, and wherein the mirror is the blocking element. In such an embodiment, the redirected collimated excitation beam and the collimated collection beam may be coaxial. In another embodiment, the probe comprises: a beam combiner disposed in the collimated collection beam, wherein the beam combiner is adapted to redirect the collimated excitation beam to the objective element; and a bandpass filter disposed in the collimated excitation beam between the beam combiner and the objective element, wherein the bandpass filter is the blocking element. In such an embodiment, the redirected collimated excitation beam and the collimated collection beam may be coaxial. Further in such an embodiment, the objective element and the bandpass filter are parts of a removable replaceable module.

In at least one embodiment, the first lens is configured to receive and collimate light from an optical fiber. In a further embodiment, the probe comprises a second lens configured to focus the collimated collection beam onto a collection fiber for transmission to a spectrometer. In yet a further embodiment, the probe comprises a second lens configured for focusing the collimated collection beam onto a collection fiber for transmission to a spectrometer, wherein the first lens is configured to receive laser light from an optical fiber. In such an embodiment, the first lens has a first focal length; the second lens has a second focal length; and the second focal length may be more than two times longer than the first focal length. Further in such an embodiment, the first optical fiber defines a first core diameter; the second optical fiber defines a second core diameter; and the second core diameter may be greater than the first core diameter. In such an embodiment, the first optical fiber may be a single multimode fiber; and the second optical fiber may comprise a bundle of individual fibers.

In another aspect of the present disclosure, an optical analysis apparatus comprises: a first optical fiber configured to convey light from a light source; a second optical fiber configured to convey light to a detector; and a probe configured to capture a spectral response through an intervening material that emits unwanted background radiation when irradiated, the probe comprising: a first lens configured to receive light from the first optical fiber and collimate the light into a collimated excitation beam defining a first aperture; an objective element adapted to focus the collimated excitation beam to a point or region in a sample through the intervening material, wherein the objective element is further adapted to receive light scattered by the sample and the intervening material and to collimate the scattered light into a collimated collection beam defining a second aperture; a blocking element disposed within the collimated collection beam and configured to block at least a portion of the light scattered by the intervening material from the collimated collection beam, wherein the second aperture defined by the collimated collection beam is at least two times greater than the first aperture defined by the collimated excitation beam; and a second lens configured to focus the collimated collection beam onto the second fiber as to convey the collimated collection beam onto a detector.

In at least one embodiment, the apparatus further comprises one or more connectors configured to secure the first optical fiber and/or the second optical fiber in optical communication with the probe. In an embodiment, the apparatus further comprises a spectrometer, which includes the detector, wherein the probe is in optical communication with the spectrometer via the second optical fiber such that the collimated collection beam is conveyed to the detector. In another embodiment, the first optical fiber defines a first core diameter; the second optical fiber defines a second core diameter; and the second core diameter may be greater than the first core diameter. In yet another embodiment, the first optical fiber is a single multimode fiber; and the second optical fiber comprises a bundle of individual fibers. In yet another embodiment, the first lens has a first focal length; the second lens has a second focal length; and the second focal length is more than two times longer than the first focal length.

In at least one embodiment, the apparatus further comprises a mirror disposed in the collimated collection beam, wherein the mirror is adapted to redirect the collimated excitation beam to the objective element, and wherein the mirror is the blocking element. In another embodiment, the apparatus further comprises: a beam combiner disposed in the collimated collection beam, wherein the beam combiner is configured to redirect the collimated excitation beam to the objective element; and a bandpass filter disposed in the collimated excitation beam between the beam combiner and the objective element, wherein the bandpass filter is the blocking element.

DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

The probes and systems according to the present disclosure achieve the advantages of spatially offset Raman spectroscopy while, in certain embodiments, enabling coaxial excitation and collection apertures. In broad and general terms, these advantages are achieved by: a) introducing a relatively small collimated laser beam into a larger collimated collection beam; and b) engineering the optical components of the probes of the present disclosure such that the light emanating from the sample is prevented from entering the collection path to the spectrometer. Though collection efficiency may be reduced somewhat due to a loss of aperture consumed by the excitation beam cross-section, a larger ratio of collection to excitation signals and the purity of the resultant collection signal more than exceed the losses, for example, in advanced bioprocess monitoring applications in which the probe may need to penetrate multiple layers of container material, e.g., as used in plastic disposable bioreactors.

As used herein, "probe" and "probehead" may be used interchangeably to describe an assembly of optical components configured to illuminate a sample with excitation light, collect scattered light from sample and interface with a light source and a detector.

Figure 4:
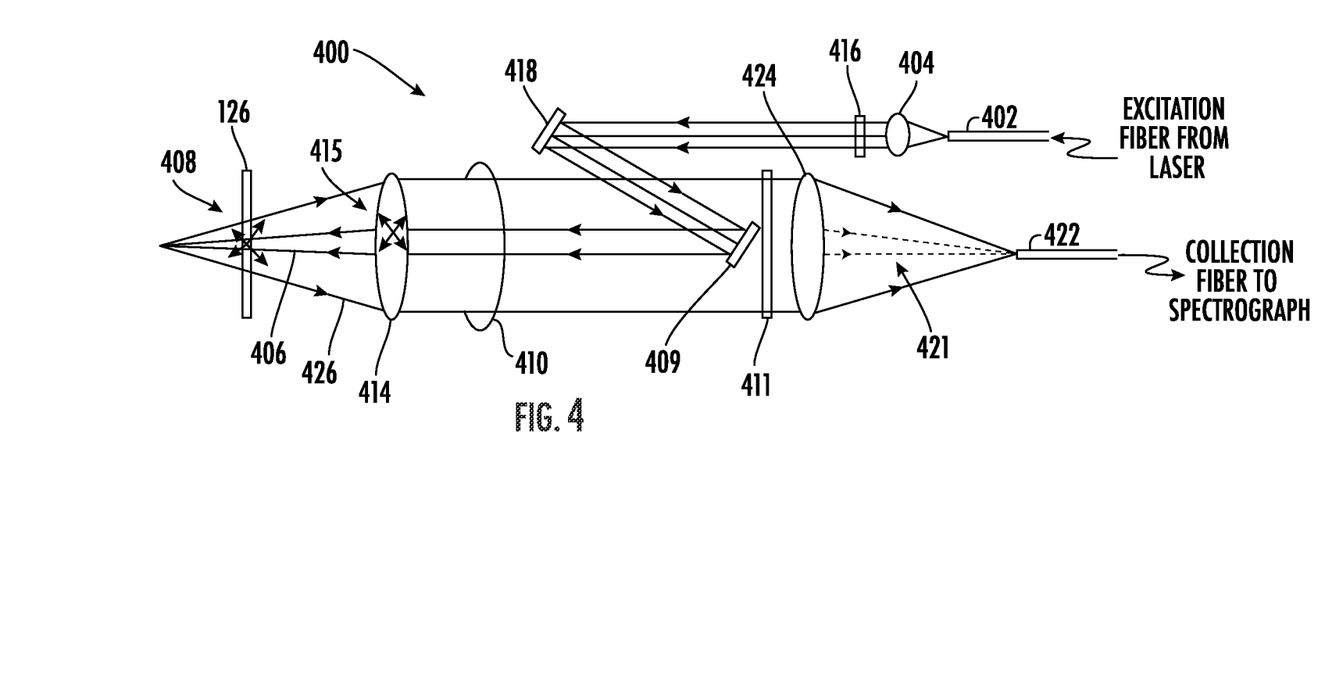
FIG. 4 is a schematic view of a probe configuration of the present disclosure.

According to at least one embodiment of the present disclosure, a probe 400 may be configured as shown schematically in FIG. 4. The probe 400 may include an excitation fiber 402, which is electromagnetically coupled to a radiation source (not shown) configured to emit excitation radiation (e.g., light) at a selected wavelength, e.g., a laser, and a excitation optic 404 adapted to collimate the excitation radiation transmitted by the excitation fiber 402. The probe 400 may further include a bandpass filter 416 selected to remove unwanted wavelengths induced by the fiber 402, for example, wavelengths excluding the selected wavelength of the radiation source. The excitation radiation transmitted via the bandpass filter 416 is routed to a sample 412 via an excitation beam 406 formed by downstream optical components of the probe 400, which may include a first mirror 418, a second mirror 409 and an objective 414 (e.g., an objective lens). Excitation radiation from the radiation source via the excitation fiber 402 is collimated by the excitation optic 404, redirected by the first mirror 418 and redirected again by the second mirror 409 into a counter-propagating space 410 to form the excitation beam 406. The objective 414 focuses the excitation beam 406 into the sample 412 at a focus point or area.

The probe 400 may include a collection fiber 422, which is electromagnetically coupled to a spectrograph (not shown) configured to spectrally separate and detect a collection beam 426 comprised of light scattered from the sample 412 resulting from the incident excitation beam 406. The collection beam 426 travels through the counter-propagating space 410 via the objective 414. In at least one embodiment, the objective 414 both focuses the collimated excitation radiation to form the excitation beam 406 and collimates the collection beam 426 of light collected from the sample 412. The probe 400 may further include a notch filter 411 adapted to reject (e.g., filter out) scattered light at the selected wavelength of the radiation (e.g., the wavelength of the radiation source), thereby rejecting elastic Rayleigh scattering from the sample 412. The probe 400 may further include a collection optic 424 adapted to transmit and input the collection beam 426 into the collection fiber 422. In certain embodiments of the probes of the present disclosure (e.g., the probe 400), the excitation fiber 402 and/or the collection fiber 422 may comprise a bundle of multiple optical fibers. As non-limiting examples, the excitation fiber 402 and/or the collection fiber 422 may comprise multi-mode or single-mode optical fiber.

In contrast to the probe 100 of FIG. 1, in at least one embodiment of the probe 400 according to the present disclosure, a cross-section of the collimated collection beam 426 is significantly larger than a cross-section of the collimated excitation beam 406 in the counter-propagating space 410. In further embodiments, instead of the beam combiner 109 of the probe 100, the mirror 409 may be included in the probe 400.

The probe 400 may be employed where the sample 412 is located within a container, such as a vessel or bioreactor, for example, a disposable, plastic bioreactor or, as a further nonlimiting example, a pipe or measuring cell conveying a process stream. Consequently, both the excitation beam 406 and light scattered from the sample 412 must be transmitted through the wall or window 126 of the container. In certain implementations of the probe 400, the window 126 may be a specific part of the container that is at least partially transparent to the excitation and scattered radiation. In further implementations in which the material of the container is at least partially transparent to the excitation and scattered radiation, the window 126 may be any suitable portion of a wall of the container that is at least partially transparent to the excitation and scattered radiation. Though the window 126 enables real-time monitoring of a process within a container or pipe, such a window may generate inferring noise.

As described, the objective 414 focuses the collimated excitation beam 406 and collimates the collection beam 426 to and from sample 412, respectively. As depicted in FIG. 4, a region 408 of the window 126 and a portion 415 of the objective 414 could each generate spurious, unwanted signals. As described herein, such unwanted signals may include fluorescence and unwanted Raman signatures from the window 126 and the objective 414. However, the region 408 and the portion 415 are smaller than the analogous regions of prior art probes, for example, the probe 100 as illustrated in FIG. 1, due to the configuration of the components of the probe 400. Not only are the regions potentially generating spurious, unwanted signals smaller in the probe 400, the second mirror 409 blocks at least a portion of these unwanted signals from entering the collection fiber 422. The second mirror 409 casts a shadow 421 that effectively blocks fluorescence and unwanted Raman signatures from the window 126 and the objective 414 from reaching the spectrograph. In probes of the prior art, for example, the probe 100, the beam combiner 109 enables such signals to be transmitted through to the fiber 122.

An aspect of the present disclosure includes a pronounced asymmetric magnification ratio between the excitation and collection beams. In prior art probe designs, such as the one depicted in FIG. 1, the ratio of an excitation image to a collection image at the target (e.g., the sample) is less than 2:1, if not substantially the same (e.g., approaching 1:1). However, probes according to the present disclosure, including the probe 400, are embodied to generate a ratio of 2:1 or greater, up to 6:1 or higher in certain embodiments. To accomplish such a ratio, a focal length of the collection optic 424 may be two to six times greater than a focal length of the excitation optic 404 adapted to collimate the excitation beam 406, resulting in a highly magnified excitation image. At the same time, the ratio of the focal length of the collection optic 424 to the focal length of the excitation optic 404 may preferably match, or at least nearly match, a ratio of a diameter of the excitation fiber(s) to the diameter of the collection fiber(s), such that the image diameters (i.e., of the excitation image and the collection image) of the excitation fiber 402 and collection fiber 422 are approximately the same at the sample.

Because the focal length of the excitation optic 404 is small relative to that of the collection optic 424, the image of the excitation fiber generated by the optical components of the probe 400 is highly magnified. The focal length of the collection optic 424, however, is comparable to or the same as objective 414 and is therefore less magnified, if at all. Moreover, since the ratio of the focal lengths of collection optic 424 to the excitation optic 404 may match the ratio of the diameters of the excitation fiber 402 and collection fiber 422 in certain embodiments, the image diameters of the two fibers 402, 422 are approximately the same at the sample 412, thereby optimizing signal-generation capacity of the probe 400.

Though single and multiple optical fibers may be used for either the excitation or collection fibers 402, 402, in at least one embodiment of the present disclosure, the excitation fiber 402 may include a single optical fiber, and the collection fiber 422 may include a bundle of optical fibers, for example, 50, more or less. The diameter of the excitation fiber 402 may be selected to define a desired ratio of the magnification of the excitation image to the collection image. In at least one embodiment, the diameter of the excitation fiber 402 may be in a range between approximately 200 microns to 1 mm. In such embodiments, the collection fiber core diameter (e.g., the diameter of an optical fiber excluding a cladding and a coating) must therefore be correspondingly larger than the excitation fiber core diameter. In certain embodiments, the desired magnification ratio may be realized with a larger circular bundle of similarly sized fibers to efficiently collect the Raman scatter from the complete illuminated sample region.

Figure 5:
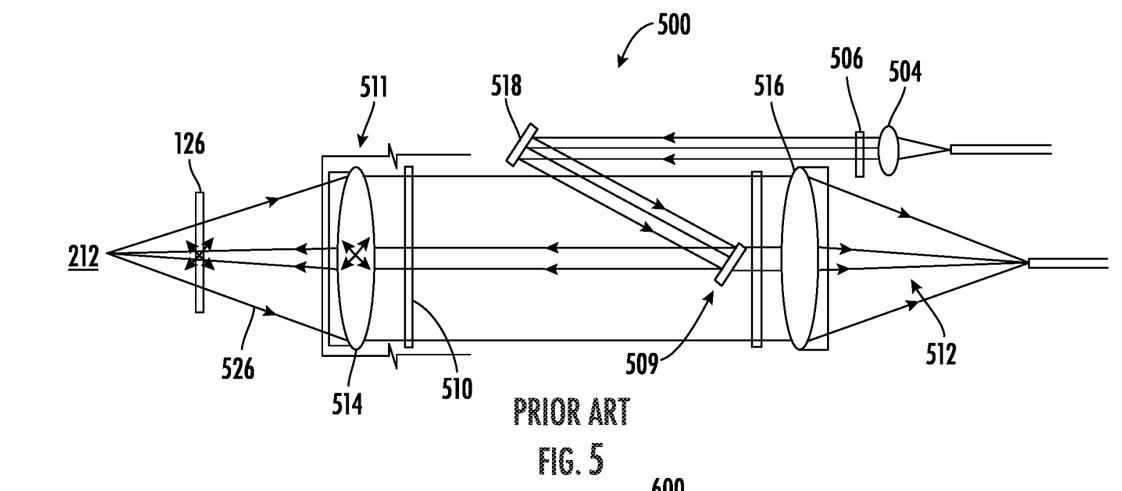
FIG. 5 is a simplified schematic view of a prior art PhAT™ probehead design.

Implementation of probes according to the present disclosure is well-suited to an existing probehead design, called the PhAT™ probe manufactured and sold by Endress+ Hauser Group's subsidiary, Kaiser Optical Systems Inc. of Ann Arbor, Mich. The PhAT™ probe is already equipped with many of the attributes just described. Details of the PhAT™ probe may be found in U.S. Pat. No. 7,148,963, the entire content of which is incorporated herein by reference. FIG. 5 is a simplified schematic diagram of a conventional PhAT™ probehead 500. Given the benefit of the present disclosure, one skilled in the art will understand that, while probes according to the present disclosure are herein described in conjunction with this particular probe design, the advantages made possible by the present disclosure are applicable to other configurations so long as the operational principles of the apparatus and methods described herein are achieved.

The probehead 500 features the efficiency of more conventional 2-fiber coaxial excitation/collection probes, but with a significantly larger excitation/collection spot size, which reduces laser power density and risk of sample damage. The circular collection fiber bundle is rearranged to form a linear array at the spectrograph entrance slit to maintain spectral resolution, and the collection signal is integrated over a large volume to give accurate readings on suspensions or solid mixtures (e.g., tablets).

Though the probehead schematic of FIG. 5 may appear similar to the arrangement probe 400 of FIG. 4, the following are non-exclusive examples of at least certain differences therebetween. For example, comparable to the conventional probe 100 of FIG. 1, the combiner 509 of probehead 500 is a transmissive wavelength-selective combiner that reflects laser excitation radiation in one direction while transmitting the excitation radiation through the combiner 509 in the other, such that background radiation from the window 126 and common objective 514 are not blocked and thus are allowed to reach the spectrometer via path 512. Further, as an option, a distal portion of the assembly may include a protective window 510 (e.g., UV sapphire), providing for a threaded objective mount 511 to accommodate different focal lengths and spot sizes. In terms of non-limiting exemplary lenses, the objectives 514, 516 may be 25-mm diameter achromats and aspheres with focal lengths in the range of 18-250 mm, whereas the laser collimating lens 504 may have a diameter of 5 mm with a focal length of 7.5 mm. The collection focusing lens 516 also may be an achromat, having a 25 mm diameter and a focal length of 35 mm, for example.

Figure 6:
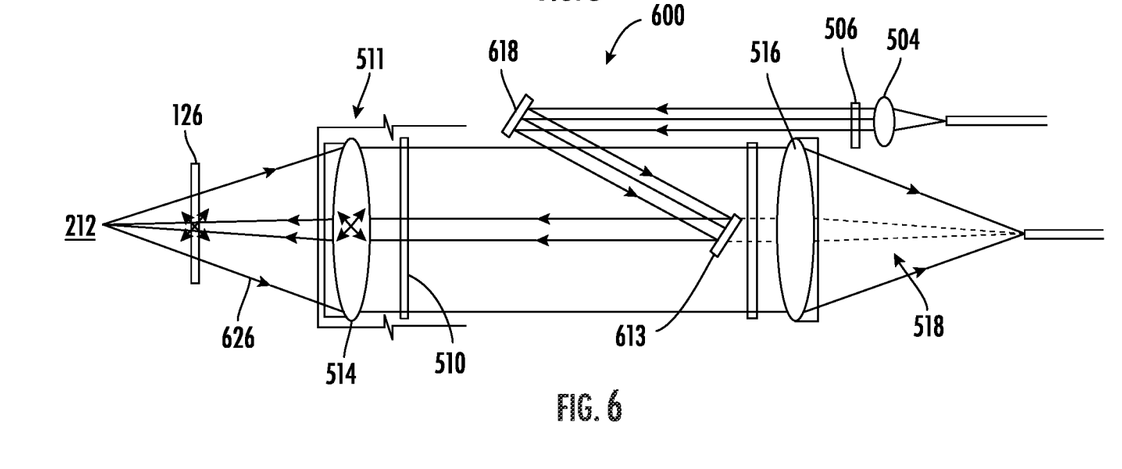
FIG. 6 shows the probehead of FIG. 5 modified in accordance with the present disclosure.

Thus, the probehead 500 incorporates a relatively, substantially larger focal length lens 516 for focusing the collection beam 526 from the sample into the collection fiber versus that of the lens 504 collimating laser light emerging from the excitation fiber. Thus, the excitation and collection path dimensions are correspondingly different in diameter. However, instead of a wavelength-selective combiner 509, a SORS probe 600 in accordance with the present disclosure, includes a second mirror 613, as shown in FIG. 6. The second mirror 613 may be supported on a "spider" mount on axis and centered on the collimated collection beam 626. As described with respect to the probe 400, the second mirror 613 creates a central obscuration in the collection path, slightly reducing the collected Raman signal from the sample withing the collection beam 626, but greatly or totally reducing the Raman/fluorescence background spectrum from the sample focusing objective 514 and window or container wall 126. As with the configuration of the probe 400, unwanted wavelengths generated by the window 126 and/or the objective 514 are blocked (e.g., shadowed) from reaching the spectrograph, as shown with broken lines 518 in FIG. 4.

Figure 7:
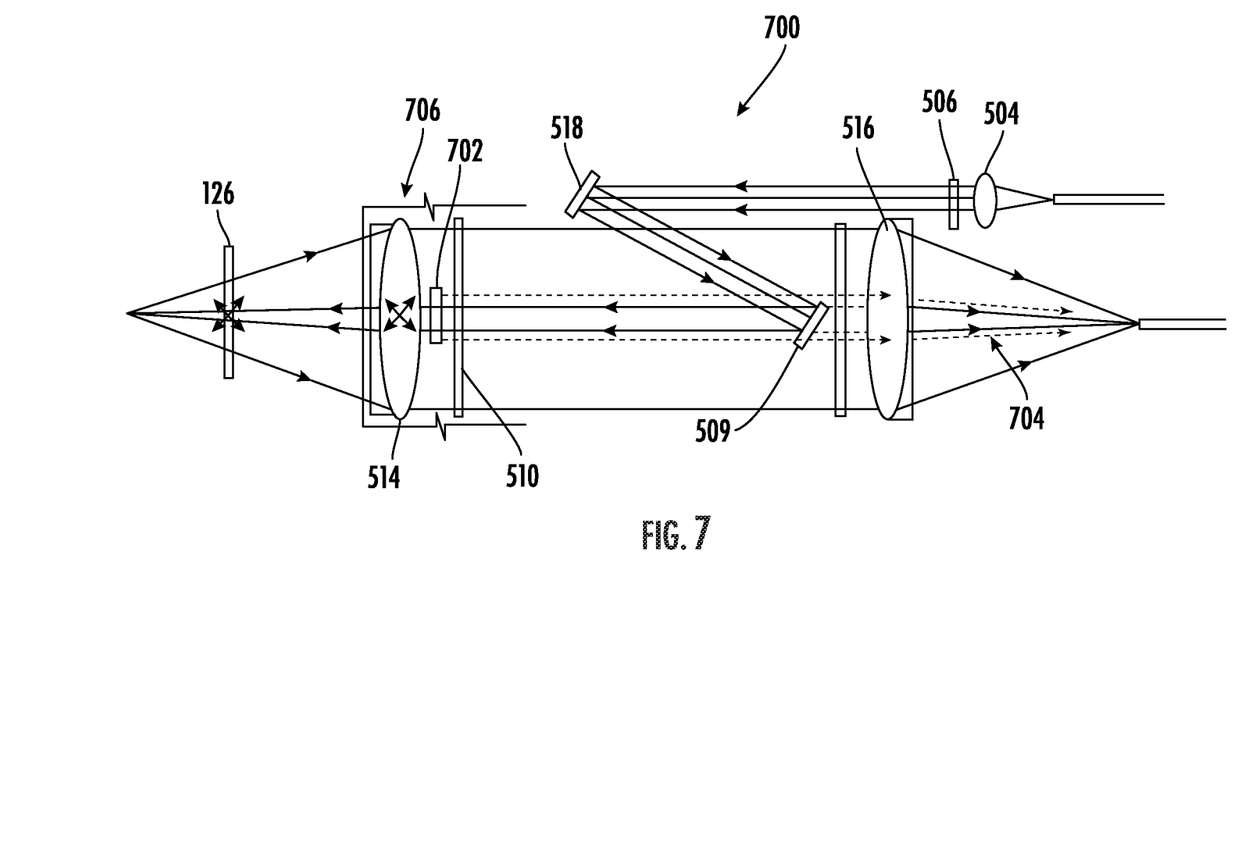
FIG. 7 is a schematic view of an alternative embodiment of the present disclosure, including a second bandpass filter mounted proximate to the common objective lens.

FIG. 7 is a simplified schematic diagram of an alternative embodiment of a probe 700 according to the present disclosure, wherein a second bandpass filter 702 is mounted proximate to common objective lens 514, optionally within a removable replaceable module 706. The second bandpass filter 702 is adapted to filter light from the excitation beam that is not in the wavelength of the radiation source, thereby enabling only light at or near the radiation source wavelength to pass through to the sample via the common objective 514. Such an embodiment facilitates modification to an existing PhAT™ probehead without structural alteration to the body and contents of the existing probehead assembly behind protective window 510. The bandpass filter 702 provides a similar function as the bandpass filter 506. Collimated excitation light reflected off the mirror 518 is redirected by the selective wavelength combiner 509 and reaches the sample through the filter 702 and the common objective 514. However, in the opposite direction, filter 702 transmits only the laser wavelength and rejects all other wavelengths, including the Raman and fluorescence generated in the container/window 126 and at least a portion of the Raman and fluorescence generated in the objective lens 514. As with beam combiner 109 (or combiner 509), the bandpass filter 702 may be suspended on a spider mount in the optical path.

Figure 3:
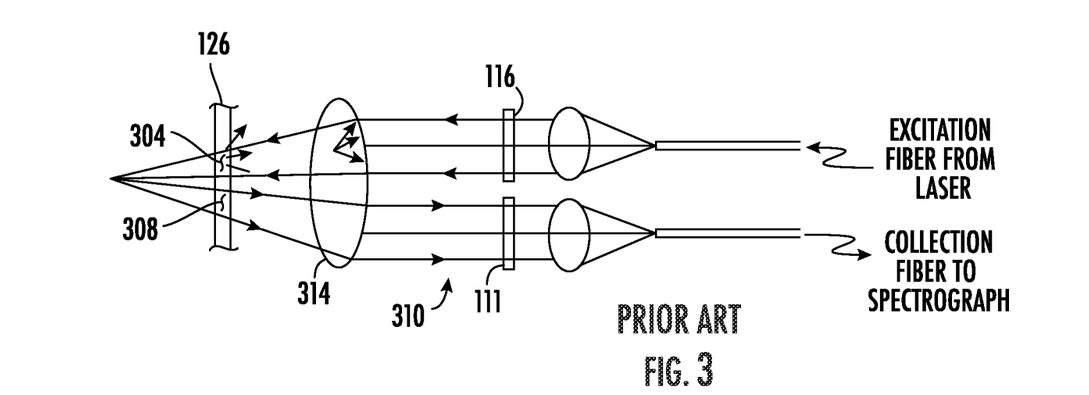
FIG. 3 is a prior art arrangement, which incorporates a common objective lens.

In a further embodiment, a conceptually similar non-coaxial approach could take similar advantage of a larger collection focal length and aperture relative to the excitation focal length and aperture, but fed to a common objective as illustrated in the prior art arrangement of FIG. 3—specifically, with a smaller excitation beam being off to the side rather than in the center of the collection path. Such a non-coaxial approach should yield possibly better rejection of the container/window background but at the expense of reduced sample Raman collection due to reduced depth of focus arising from less overlap between non-coaxial excitation and collection paths within the sample.

In a yet further alternative embodiment, embodiment according to the present disclosure are applicable to non-fiber-coupled excitation and/or collection beams—specifically, with lasers and/or spectrographs in close proximity to the probe, thereby enabling free-space optics. Further, embodiments of the present disclosure are not limited in terms of the "container" or "window" to be penetrated, which may include one or more layers of polymeric or other materials capable of introducing background noise into the collected signal stream. The embodiments of the present disclosure are also not limited in terms of the material phase of the sample, which may include without limitation gasses, liquids, slurries and solids.

Figure 8:
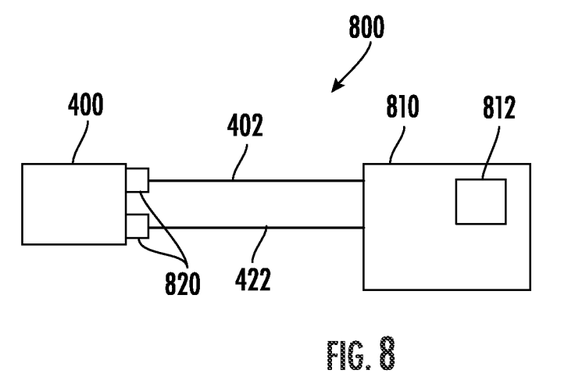
FIG. 8 shows an optical analysis apparatus of the present disclosure.

In at least one embodiment according to the present disclosure as shown in FIG. 8, probes according to the present disclosure may be implemented in an optical analysis apparatus 800. The optical analysis apparatus 800 may include any embodiment of the probes of the present disclosure, including but not limited to the probe 400, the probe 600 and the probe 700. The optical analysis apparatus 800 may include a first optical fiber, for example, the excitation fiber 402, for conveying excitation light from a radiation (e.g., light) source, such as a laser, to the probe 400. The optical analysis apparatus 800 may further include a second optical fiber, for example, the collection fiber 422, for conveying the collection beam collected by the probe 400 to a detector 812 of a spectrometer 810. To secure the excitation fiber 402 and the collection fiber 422 to the probe 400, the optical analysis apparatus 800 may include one or more connectors 820 configured to secure the first optical fiber and/or the second optical fiber in optical communication with the probe 400. Such connectors may be complementary connectors of a housing of the probe 400 and each of the respective optical fibers 402, 422.

While various embodiments of an optical measurement probe and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and thus remain within the scope of the present disclosure.

Claimed is:

1. An optical analysis apparatus, comprising:
a first optical fiber configured to convey light from a light source;
a second optical fiber configured to convey light to a detector; and
a probe configured to capture a spectral response through an intervening material that emits unwanted background radiation when irradiated, the probe comprising:
a first lens configured to receive light from the first optical fiber and collimate the light into a collimated excitation beam defining a first aperture;
an objective element adapted to focus the collimated excitation beam to a point or region in a sample through the intervening material, wherein the objective element is further adapted to receive light scattered by the sample and the intervening material and to collimate the scattered light into a collimated collection beam defining a second aperture;
an optical element disposed in the collimated collection beam, wherein the optical element is adapted to redirect the collimated excitation beam to the objective element;
a blocking element disposed within the collimated collection beam and configured to block at least a portion of the light scattered by the intervening material from the collimated collection beam, wherein the blocking element is a bandpass filter disposed in the collimated excitation beam between the optical element and the objective element,
wherein the second aperture defined by the collimated collection beam is at least two times greater than the first aperture defined by the collimated excitation beam; and
a second lens configured to focus the collimated collection beam onto the second optical fiber as to convey the collimated collection beam onto a detector.

2. The apparatus of claim 1, further comprising one or more connectors configured to secure the first optical fiber and/or the second optical fiber in optical communication with the probe.

3. The apparatus of claim 1, further comprising a spectrometer, which includes the detector, wherein the probe is in optical communication with the spectrometer via the second optical fiber such that the collimated collection beam is conveyed to the detector.

4. The apparatus of claim 1, wherein:
the first optical fiber defines a first core diameter;
the second optical fiber defines a second core diameter; and the second core diameter is greater than the first core diameter.

5. The apparatus of claim 1, wherein:
the first optical fiber is a single multimode fiber; and
the second optical fiber comprises a bundle of individual fibers.

6. The apparatus of claim 1, wherein:
the first lens has a first focal length;
the second lens has a second focal length; and
the second focal length is more than two times longer than the first focal length.

7. The apparatus of claim 1, wherein the probe comprises a mirror disposed in the collimated collection beam, wherein the mirror is adapted to redirect the collimated excitation beam to the objective element, and wherein the mirror is the blocking element.

8. The apparatus of claim 1, wherein the probe comprises:
a beam combiner disposed in the collimated collection beam, wherein the beam combiner is configured to redirect the collimated excitation beam to the objective element; and
a bandpass filter disposed in the collimated excitation beam between the beam combiner and the objective element, wherein the bandpass filter is the blocking element.

9. The apparatus of claim 1, wherein the optical element is a beam combiner or a mirror.

10. The apparatus of claim 1, wherein the bandpass filter of the blocking element is a first bandpass filter, the apparatus further comprising a second bandpass filter disposed in the collimated excitation beam between the first lens and the optical element disposed in the collimated collection beam.

11. The apparatus of claim 1, wherein the redirected collimated excitation beam and the collimated collection beam are coaxial, and the blocking element is disposed coaxially with the optical element and the objective element.

12. The apparatus of claim 1, wherein the redirected collimated excitation beam and the collimated collection beam are non-coaxially aligned.

13. An optical measurement probe for capturing a spectral response through an intervening material emitting unwanted background radiation, the probe comprising:
a first lens configured to receive light and collimate the light into a collimated excitation beam defining a first aperture;
an objective element adapted to focus the collimated excitation beam to a point or region in a sample through the intervening material, wherein the objective element is further adapted to receive light scattered by the sample and the intervening material and to collimate the scattered light into a collimated collection beam defining a second aperture; and
an optical element disposed in the collimated collection beam, wherein the optical element is adapted to redirect the collimated excitation beam to the objective element; and
a blocking element disposed within the collimated collection beam and configured to remove the light scattered by the intervening material from at least a portion of the collimated collection beam received from the sample, wherein the blocking element is a bandpass filter disposed in the collimated excitation beam between the optical element and the objective element.

14. The probe of claim 13, wherein the redirected collimated excitation beam and the collimated collection beam are non-coaxially aligned.

15. The probe of claim 13, wherein the objective element and the blocking element are parts of a removable replaceable module.

16. The probe of claim 13, further comprising a second lens configured for focusing the collimated collection beam onto a collection fiber for transmission to a spectrometer, wherein the first lens is configured to receive and collimate laser light from an optical fiber.

17. The probe of claim 16, wherein:
the first lens has a first focal length;
the second lens has a second focal length; and
the second focal length is more than two times longer than the first focal length.

18. The probe of claim 13, wherein the redirected collimated excitation beam and the collimated collection beam are coaxial, and the blocking element is disposed coaxially with the optical element and the objective element.

19. The probe of claim 13, wherein the second aperture defined by the collimated collection beam is at least two times greater than the first aperture defined by the collimated excitation beam.

20. The probe of claim 13, wherein the optical element is a beam combiner or a mirror.

* * * * *